United States Patent [19]

Challita et al.

[11] Patent Number: 5,049,771
[45] Date of Patent: Sep. 17, 1991

[54] ELECTRICAL MACHINE

[75] Inventors: Antonios Challita, Bellbrook; David P. Bauer, Xenia, both of Ohio

[73] Assignee: IAP Research, Inc., Dayton, Ohio

[21] Appl. No.: 541,382

[22] Filed: Jun. 21, 1990

[51] Int. Cl.$^5$ .......................................... H02K 13/00
[52] U.S. Cl. .................................... 310/219; 310/216; 310/178; 310/179; 310/232; 310/261
[58] Field of Search ............... 310/254, 259, 261, 264, 310/89, 179, 57, 58, 59, 61, 232, 213, 227, 178, 248, 71, 251, 60 R, 239, 216

[56] References Cited

U.S. PATENT DOCUMENTS

| | | | |
|---|---|---|---|
| 3,316,519 | 4/1967 | Maytone | 310/248 U X |
| 3,863,083 | 1/1975 | Jaeschke | 310/58 |
| 4,041,337 | 8/1977 | Mole | 310/178 |
| 4,137,474 | 1/1979 | Krieger | 310/227 |
| 4,277,708 | 7/1981 | McNab et al. | |
| 4,349,760 | 9/1982 | Diepers | |
| 4,358,699 | 11/1982 | Wilsdorf | 310/251 |
| 4,459,504 | 7/1984 | Weldon et al. | |
| 4,503,349 | 3/1985 | Miller | 310/178 |
| 4,547,636 | 10/1985 | Mizuno | 310/232 |
| 4,562,368 | 12/1985 | Weldon et al. | |
| 4,858,304 | 8/1989 | Weldon | 310/178 |

OTHER PUBLICATIONS

"Parameter Selection for Homopolar Generators Used as Pulsed Energy Stores", Richard A. Marshall and William F. Weldon, Center for Electromechanics, University of Texas, Austin, Jul. 1980.

Primary Examiner—R. Skudy
Attorney, Agent, or Firm—Jacox & Meckstroth

[57] ABSTRACT

An electrical machine which has a rotor positioned within a housing. The rotor has a pair of spaced-apart engagement portions, which, preferably, are tapered. The engagement portions are engaged by collectors or brushes which are arranged in annular configuration around the engagement portions. Retainer support the collectors and serve as electrical conductors with respect to the collectors. Wick elements engage the tapered portions of the rotor adjacent the collectors and provide lubrication and coolant fluid to the collectors and to the surfaces of the engagement portions of the rotor. Actuator mechanisms continuously urge the retainer members and the collectors in an axial direction upon the engagement portions to automatically compensate for wearing action between the collectors and the engagement portions of the rotor. A stator encompasses the rotor to create a magnetic field which encompasses the rotor.

11 Claims, 4 Drawing Sheets

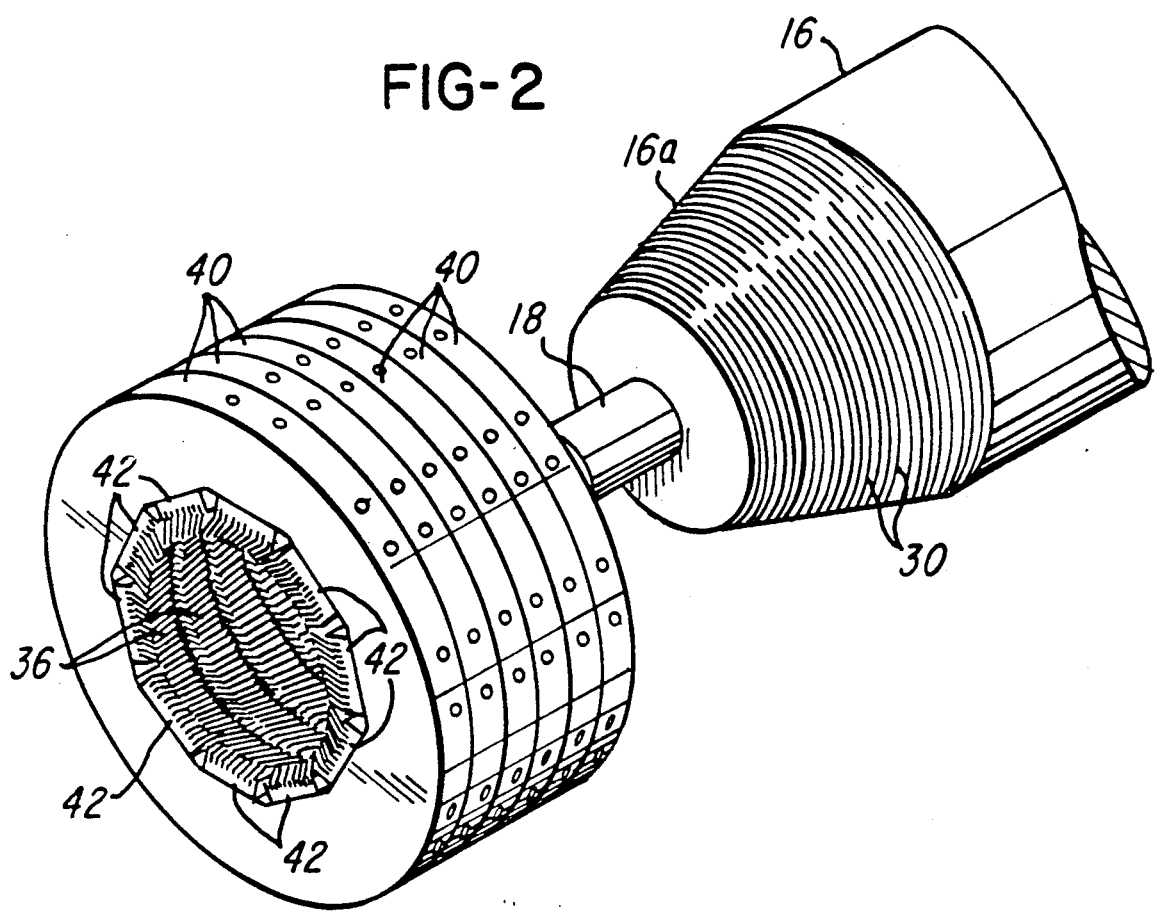

5,049,771

ELECTRICAL MACHINE

The invention described herein may be manufactured and used by the Government of the United States for all governmental purposes without the payment of any royalty.

BACKGROUND OF THE INVENTION

This invention pertains to an electrical machine through which high magnitudes of electrical current flow. This invention pertains particularly, but not necessarily, to an electrical homopolar machine.

An electrical homopolar machine is normally capable of relatively high magnitudes of electric current in consideration of the physical size of the machine. However, such large electric currents are normally associated with low voltages.

An homopolar machine includes a rotor through which electric currents flow. Brushes engage portions of the rotor for conducting electric current to and from the rotor.

Homopolar machines are shown in patents, such as U.S. Pat. Nos. 4,562,368 and 4,459,504.

Problems have existed with regard to various aspects of a homopolar machine.

It is an object of this invention to provide an electrical machine, which may be an homopolar electrical machine, which is capable of very efficient operation while being capable of high magnitudes of electrical current in consideration of the physical size of the machine.

It is another object of this invention to provide such an electrical machine in which the brushes or current collectors and the surfaces engaged thereby are provided with a continuously flowing cooling and lubricating agent.

It is another object of this invention to provide such an electrical machine in which the brushes or collectors have a low value of frictional resistivity and a low value of electrical resistivity.

It is another object of this invention to provide such an electrical machine in which the collectors or brushes can be constructed of a material which has excellent electric current conductivity.

It is another object of this invention to provide such an electrical machine which includes means for cooling internal portions of the machine.

It is another object of this invention to provide such an electrical machine in which the rotor surfaces which are engaged by brushes or collectors include means for uniform wearing of the rotor surfaces and uniform wearing of the brushes or collectors.

It is another object of this invention to provide such an electrical machine in which the brushes or collectors are automatically adjusted upon the engaged surfaces as wearing of the brushes or collectors occurs.

It is another object of this invention to provide such an electrical machine in which straps for electrical connection to the brushes or collectors are not necessary.

It is another object of this invention to provide such an electrical machine which has current collectors or brushes which engage the rotor of the machine at a maximum number of spots or regions in consideration of the physical dimensions of the collectors or brushes.

It is another object of this invention to provide such an electrical machine in which the brushes or collectors and the portions of the rotor engaged thereby have maximum engagement area in consideration of the physical dimensions of the rotor, thus providing maximum electrical capacity in consideration of the physical dimensions of the electrical machine.

Other objects and advantages of this invention reside in the construction of the electrical machine and the elements thereof, the combination thereof, and the method and mode of operation, as will become more apparent from the following description.

SUMMARY OF THE INVENTION

An electrical machine of this invention may be an homopolar machine. The electrical machine comprises a housing. Within the housing are a rotor and means encompassing the rotor for producing a magnetic field which encompasses the rotor. The homopolar machine also includes electrical current collector means in engagement with the rotor. The rotor, preferably, includes tapered or beveled engagement portions, which are engaged by brush members or collector members. The brush members or collector members are arranged in an annular formation encompassing the rotor. Preferably, the brushes or collectors are of a material which has excellent current conductivity, such as copper or the like.

Means are provided for flow of fluid into the machine for cooling internal portions of the machine, including means for cooling and lubricating the moving surfaces and the brushes or collectors which engage the moving surfaces.

Means are provided for automatic adjustment of the brushes or collectors as wearing thereof occurs.

As a result of the novel construction, an electrical machine of this invention can be constructed to efficiently conduct high magnitudes of electrical current in consideration of the physical size of the machine.

BRIEF DESCRIPTION OF THE VIEWS OF THE DRAWINGS

FIG. 2 is a perspective exploded view, drawn on a larger scale than FIG. 1, illustrating portions of the electrical machine of this invention.

DETAILED DESCRIPTION OF THE PREFERRED EMBODIMENTS

Figure 1:
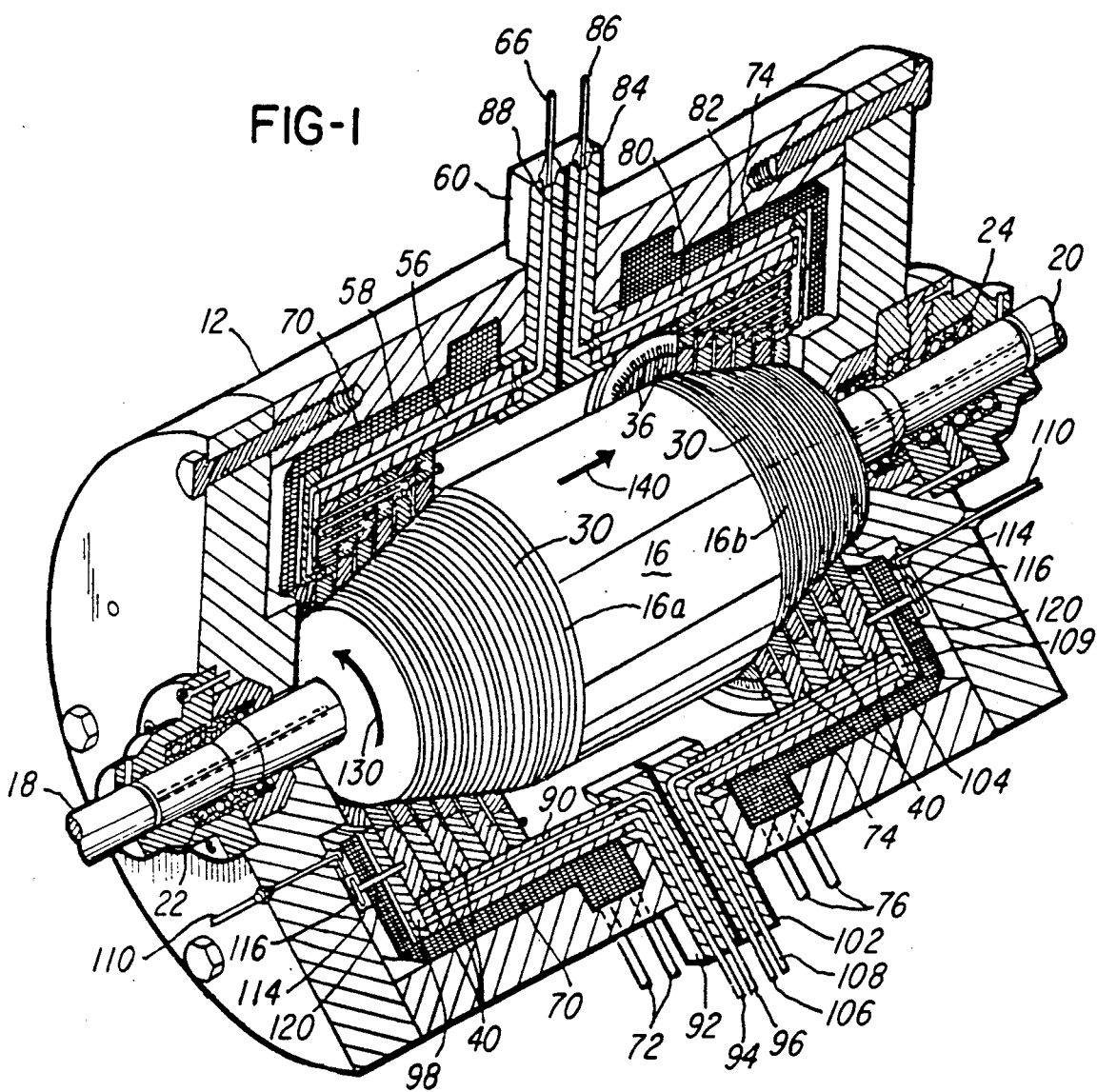
FIG. 1 is a perspective view of an electrical machine of this invention, with parts shown in section.

An electrical machine of this invention is shown generally in FIG. 1. The electrical machine is shown as being an homopolar electrical machine which comprises a stator element in the form of a magnetizable housing 12. A rotor 16 is within the housing 12. The rotor 16 may be constructed of any suitable electrically conductive material. The rotor 16 has shaft portions 18 and 20, which are rotatably supported in bearing members 22 and 24, respectively. The rotor 16 has beveled or tapered end portions 16a and 16b. The surface of each of the beveled or tapered end portions 16a and 16b is provided with grooves 30, as illustrated in FIGS. 1, 2, 3, 5, and 6. The grooves 30 in the surfaces of the end portions 16a and 16b are preferably helical.

Figure 4:
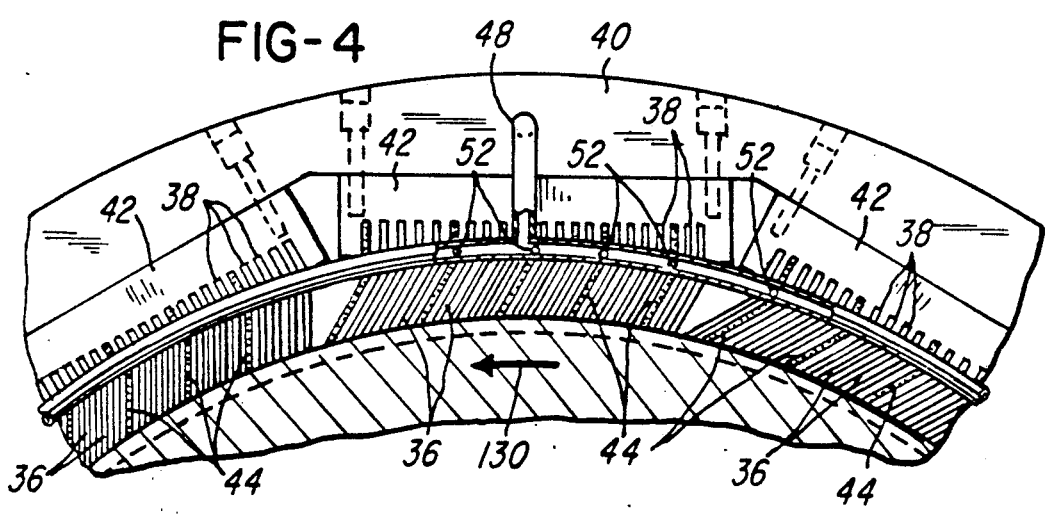
FIG. 4 is an enlarged fragmentary sectional view, drawn on substantially the same scale as FIG. 3, showing another portion of the electrical machine of this invention.
Figure 3:
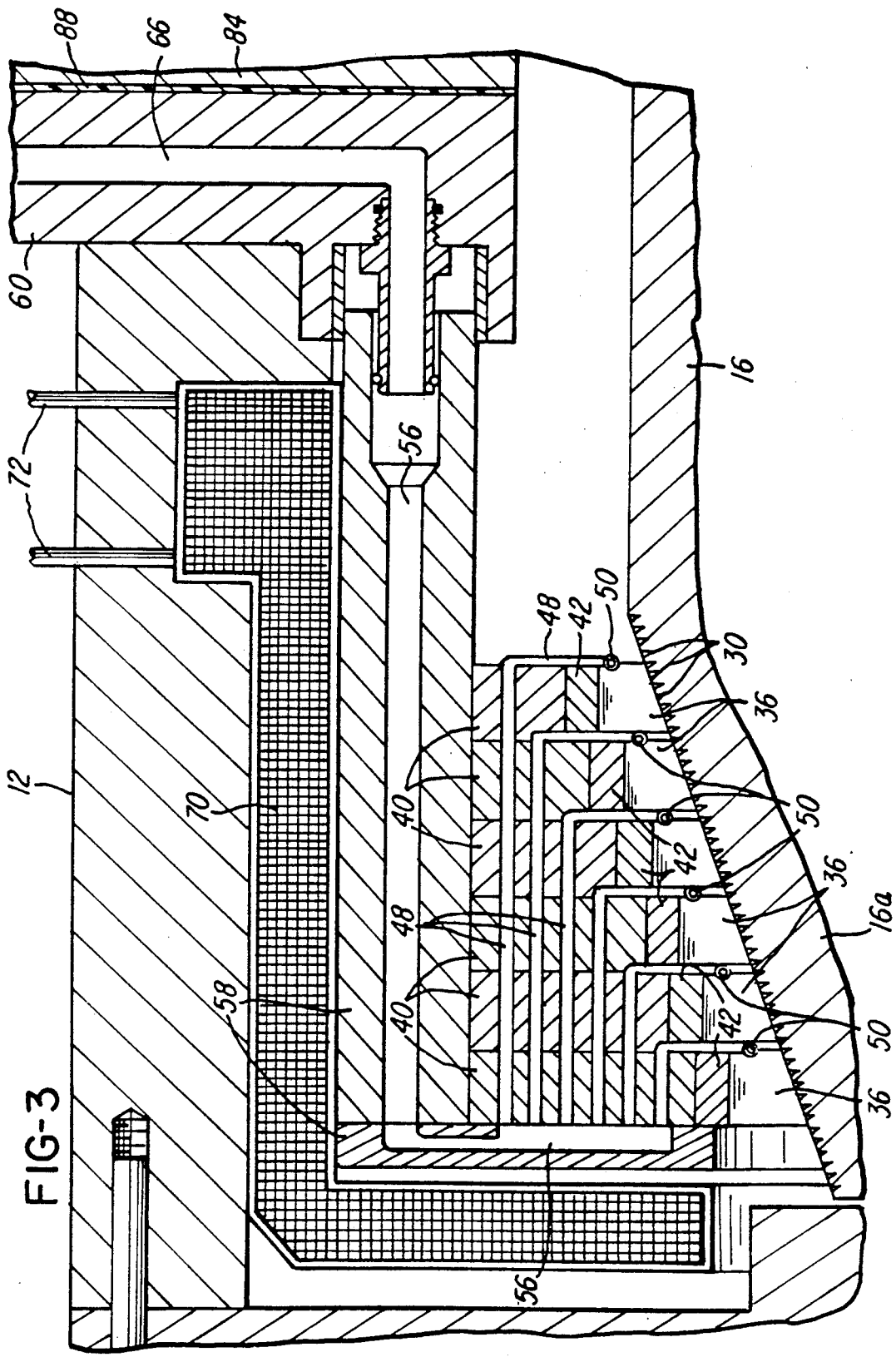
FIG. 3 is an enlarged fragmentary sectional view showing a portion of the electrical machine of this invention.
Figure 5:
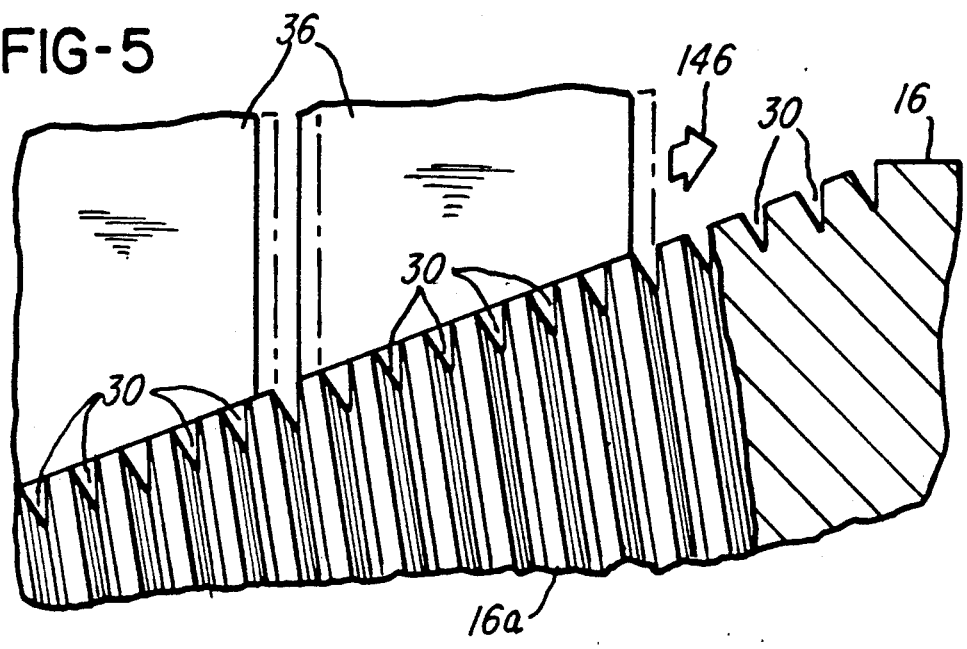
FIG. 5 is an enlarged fragmentary sectional view, drawn on a larger scale than FIG. 4, showing collector members and a portion of the rotor which is engaged by the collector members.

In engagement with the beveled or tapered end portions 16a and 16b of the rotor 16 are collectors or brushes 36. Each of the collectors or brushes 36 comprises an individual relatively thin leaf. As best shown in FIG. 4, the collectors 36 are mounted in spacedapart slots 38 in holders 42 which are mounted within annular retainers 40. Thus, each of the collectors or brushes 36 is spaced from its adjacent collector or brush 36. The annular retainers 40 encompass the beveled or tapered end portions 16a and 16b. Preferably, each of the collectors 36 is of solid copper material or other good electrical conductor material. FIG. 1 shows six annular retainers 40 at each of the tapered end portions 16a and 16b and encompassing each of the end portions 16a and 16b. FIGS. 2 and 3 also show six annular retainers 40 at the end portion 16a. However, of course, a larger number or smaller number of annular retainers 40 may be employed, as each of the annular retainers has mounted therein a plurality of holders 42 and a plurality of collectors 36.

Figure 7:
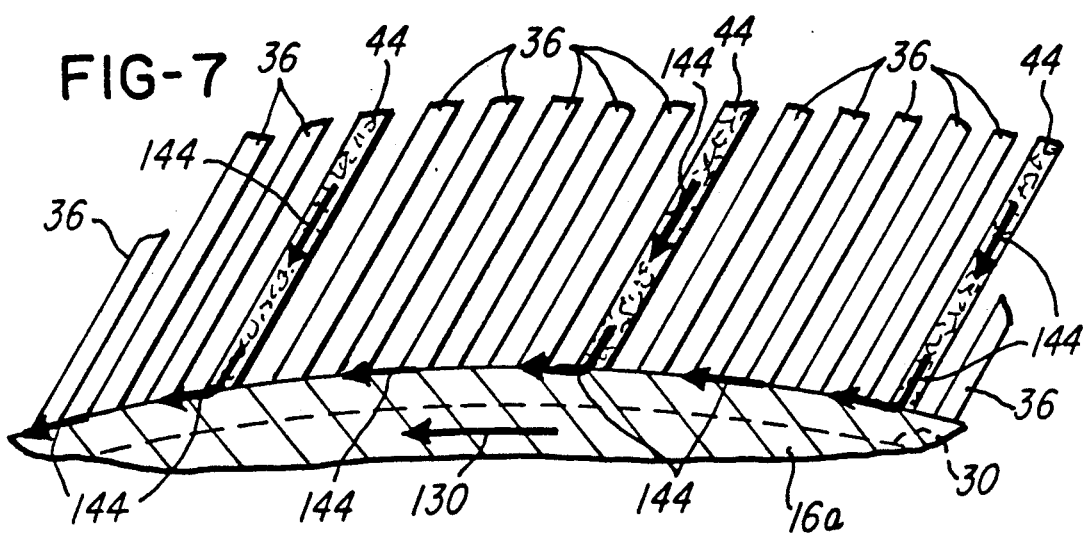
FIG. 7 is a fragmentary sectional view taken substantially on line 7—7 of FIG. 6.

As best shown in FIG. 4, the collectors 36 are arranged in groups in the holders 42, as the holders 42 and the collectors 36 are retained by the annular retainers 40 which encompass the end portions 16a and 16b of the rotor 16. As best shown in FIGS. 4 and 7, interspersed among the collectors 36 are wick members 44. The wick members 44 are retained by the holders 42 and are of any suitable material which has good fluid conducting qualities. As best shown in FIGS. 3 and 4, within the holders 42 and within the annular retainers 40 are fluid conduit passages 48. Each of the fluid conduit passages 48 has fluid communication with an annular tubular fluid conductor 50. The annular tubular fluid conductors 50 are supported by the holders 42 and have openings 52 which are in fluid communication with the wicks 44. The fluid conduit passages 48 which are adjacent the tapered end portion 16a are in fluid communication with a primary fluid conduit 56 which is within an electrical conductor 58. The electrical conductor 58 is in slidable electrical engagement with an electrical bus bar 60 within which is a fluid conduit 66. The fluid conduit 66 is in fluid communication with the fluid conduit 56 which is within the electrical conductor 58. The electrical bus bar 60 extends from the housing 12.

Encompassing the tapered end portion 16a of the rotor 16 and carried by the magnetizable housing 12 is a stator element, herein shown as an electrical field coil 70. Electric conductor members 72 are joined to the electrical field coil 70 and extend from the field coil 70 and from the housing 12. Encompassing the tapered end portion 16b of the rotor 16 and carried by the magnetizable housing 12 is a stator element, herein shown as an electrical field coil 74. Electric conductor members 76 are joined to the electrical field coil 74 and extend from the field coil 74 and from the housing 12.

As stated above and as shown, the annular retainers 40 encompass the tapered end portion 16b of the rotor 16 and retain the holders 42, which retain the collectors 36 which engage the tapered end portion 16b. The fluid conduit passages 48 which are within the annular retainers 40 and which are adjacent the tapered end portion 16b are in fluid communication with a primary fluid conduit 80 which is within an electrical conductor 82, as shown in FIG. 1. The electrical conductor 82 is in slidable engagement with an electrical bus bar 84 within which is a fluid conduit 86.

This structure is similar to that shown in FIG. 1 with respect to the electrical conductor 58 and the bus bar 60 and discussed above. The electrical bus bar 84 extends from the housing 12 and is closely adjacent the electrical bus bar 60, as shown in FIG. 1. The electrical bus bar 60 and the electrical bus bar 84 are separated by electrical insulation material 88. The electrical bus bars 60 and 84 are shown at the upper part of FIG. 1 and are partially shown in FIG. 3.

As shown in FIG. 1, at the lower part thereof, the annular retainers 40 which encompass the tapered end portion 16a are electrically joined to an electrical conductor 90, which is electrically joined to an electrical bus bar 92. The electrical bus bar 92 extends from the housing 12, as shown at the lower part of FIG. 1.

Within the electrical bus bar 92 and within the electrical conductor 90 is a fluid conduit 94 and a fluid conduit 96. The fluid conduits 94 and 96 are joined at the inner ends thereof by a connector passage 98. Coolant fluid flows through the fluid conduit 94 and into the connector passage 98. The fluid then flows outwardly through the fluid conduit 96. Thus, the electrical bus bar 92 and the electrical conductor 90 are cooled.

A similar structure exists with respect to the collector retainers 40 which encompass the tapered end portion 16b of the rotor 16. As shown in FIG. 1, an electrical bus bar 102 is electrically joined to an electrical conductor 104, which is electrically joined to the collector retainers 40 which encompass the tapered end portion 16b of the rotor 16. Within the electrical bus bar 102 and within the electrical conductor 104 are fluid conduits 106 and 108 which are joined by a connector passage 109. These fluid conduits 106 and 108 serve in the same manner as the fluid conduits 94 and 96, so that fluid flowing through the fluid conduits 106 and 108 removes heat from the bus bar 102 and from the electrical conductor 104.

At each end portion of the housing 12 is a fluid conductor 110, which is in fluid communication with a chamber 114 which is within the housing 12. Within the chamber 114 is a piston 116, to which is attached an actuator rod 120. Each actuator rod 120 is in engagement with a set of the annular collector retainers 40.

Fluid is introduced into the fluid conductors 110 and into the chambers 114. The fluid pressure within each of the chambers 114 is constant and urges the pistons 116 and the actuator rods 120 toward the annular collector retainers 40. Thus, the annular collector retainers 40 and the holders 42 and the collectors 36 are urged to move axially along the tapered portions 16a and 16b of the rotor 16. Thus, if wear of the collectors 36 occurs, the annular collector retainers 40 and the holders 42 and the collectors 36 are moved axially along tapered portions 16a and 16b of the rotor 16. Thus, the collectors 36 are automatically moved along the tapered end portions 16a and 16b as wear of the collectors 36 occurs.

When the annular retainers 40 and the holders 42 and the collectors 36 are moved axially along the rotor 16, the electrical conductor 58 is slidably moved with respect to the electrical bus bar 60. Thus, electrical connection between the electrical bus bar 60 and the electrical conductor 58 is maintained. Also, as this movement occurs, fluid communication between the fluid conduits 56 and 66 is maintained. This same action occurs between the electrical bus bar 92 and the electrical conductor 90. This same action occurs between the electrical bus bar 84 and the electrical conductor 82 and between the electrical bus bar 102 and the electrical conductor 104.

An electrical machine of this invention is capable of serving as an electrical generator or as an electrical motor. When an electrical machine of this invention serves as an electrical generator, motor means are joined to the shaft extension 18 and/or to the shaft extension 20, and the rotor 16 is rotated. In FIGS. 1, 4, and 7 an arrow 130 illustrates rotation of the rotor 16.

Electrical energy is applied to the field coil 70 by means of the electrical conductors 72, and electrical energy is applied to the field coil 74 by means of the electrical conductors 76. Thus, a magnetic field which encompasses the rotor 16 is established.

The electric bus bar 60 and the electric bus bar 92 are electrically connected together, in a manner not shown. As shown, the electric bus bars 60 and 92 are electrically joined to the electrical conductors 58 and 90, respectively, which are electrically connected to the annular collector retainers 40, which are electrically connected to the collectors 36. The bus bar 84 and the bus bar 102 are electrically connected together in a manner not shown. As shown, the bus bars 84 and 102 are in an electrical circuit with electrical conductors 82 and 104.

In FIG. 1 an arrow 140 illustrates current flow from the tapered end portion 16a to the tapered end portion 16b as the rotor 16 is rotated. Thus, electrical current flows into the tapered end portion 16a through the bus bars 60 and 92. The electrical current then flows through the electrical conductors 58 and 90, through the annular retainers 40, and through the collectors 36 and into the tapered end portion 16a. The electrical current then flows from the tapered end portion 16a, through the rotor 16 to the tapered end portion 16b. The electrical current then flows from the tapered end portion 16b, through the collectors 36 and from the collectors 36 through the annular retainers 40 and into the electrical conductors 82 and 104. Then the current flows outwardly through the bus bars 84 and 102.

When the electrical machine of this invention serves as an electrical generator any suitable load is electrically connected in an electrical circuit. The electrical circuit is connected to the bus bars 84 and 102, which are joined together. The electrical circuit is also connected to the bus bars 60 and 92, which are joined together. As shown and as stated, the bus bars 60 and 92 are electrically insulated from the bus bars 84 and 102.

As this electrical current flows, fluid flows into the fluid conduit 66 which is within the bus bar 60. Fluid also flows into the fluid conduit 86 which is within the bus bar 84. The fluid flows from the fluid conduit 66 into the fluid conduit 56 which is within the electrical conductor 58. Fluid flows from the fluid conduit 86 into the fluid conduit 80 which is within the electrical conductor 82. Fluid then flows through the fluid conduits 56 and 80 and into the fluid passages 48 within the annular retainers 40 and into the annular fluid conductors 50 and into the wicks 44. The wicks 44 are in engagement with the tapered end portions 16a and 16b and are interspersed among the collectors 36.

Figure 6:
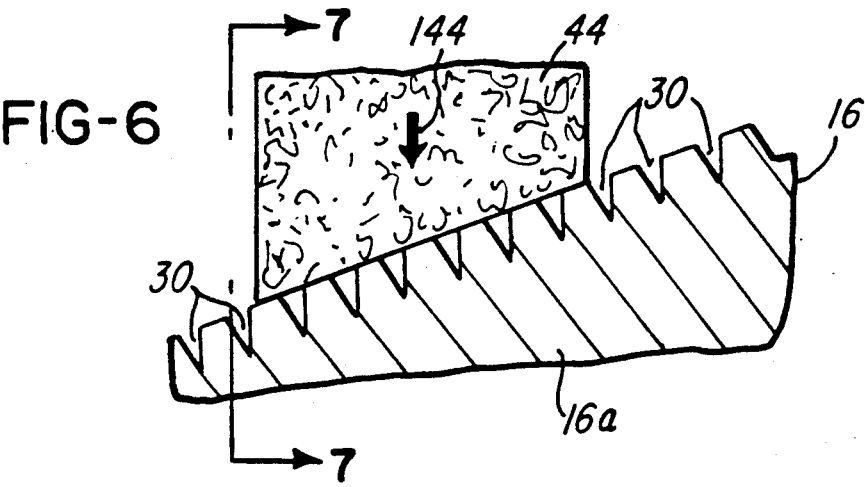
FIG. 6 is an enlarged fragmentary sectional view, drawn on substantially the same scale as FIG. 5, showing a portion of an engagement portion of the rotor of the electrical machine and illustrating means for cooling and lubricating the collector members and portions of the rotor which are engaged by the collector members.

Thus, as illustrated by arrows 144 in FIGS. 6 and 7, the wicks 44 conduct fluid to the surfaces of the tapered end portions 16a and 16b of the rotor 16. The fluid flows from the wicks 44 to the surfaces of the tapered end portions 16a and 16b and to the engagement portions of the collectors 36. As fluid flows from the wicks 44 to the surfaces of the tapered end portions 16a and 16b, a thin film of liquid is formed on those surfaces. The film is carried upon those surfaces, and the film engages the portions of the collectors 36 which engage those surfces. The grooves 30 provide surface areas upon which liquid flowing from the wicks 44 forms a film. As the rotor 16 rotates, evaporation of the film occurs. Thus, the surfaces of the tapered end portions 16a and 16b of the rotor 16 and the engagement portions of the collectors 36 are lubricated and cooled as fluid flows from the wicks 44, as illustrated in FIG. 7.

As the rotor 16 rotates, the collectors 36 which are in engagement with the tapered end portions 16a and 16b may wear as surface engagement parts of the collectors 36 are removed from the collectors 36. Such wearing is minimal due to the fact that the collectors 36 and the tapered end portions 16a and 16b are lubricated and cooled by fluid which flows from the wicks 44. However, as such wearing of the collectors 36 occurs, the actuator rods 120 urge the annular retainers 40 to move axially, as the actuator rods 120 are urged by the pistons 116 to which constant pressure is applied by fluid which is supplied through the fluid conductors 110 to the chambers 114. Thus, there is automatic adjustment of the collectors 36 in an axial direction upon the tapered end portions 16a and 16b as wearing of the collectors 36 occurs. This movement is illustrated by broken lines and by an arrow 146 in FIG. 5.

As the annular retainers 40 are moved in an axial direction upon the tapered end portion 16a of the rotor 16, the electrical conductor 58 is moved in an axial direction and is moved closer to the bus bar 60, as the electrical conductor 58 is slidably joined to the bus bar 60. Thus, electrical engagement between the electrical conductor 58 and the bus bar 60 is maintained. As this relative movement between the electrical conductor 58 and the bus bar 60 occurs, the fluid conduit 56 is maintained in fluid communication with the fluid conduit 66, as shown in FIG. 3. Thus, fluid continuously flows through the fluid conduits 66 and 56 and to the wicks 44 and to the collectors 36 and to the tapered end portion 16a. This same procedure occurs with regard to the electrical conductor 90 and the electrical bus bar 92. This same procedure occurs with regard to the electrical conductors 82 and 104 which are adjacent the tapered end portion 16b of the rotor 16 and which are electrically joined to the bus bars 84 and 102, respectively.

Furthermore, as stated and as illustrated, in an electrical machine of this invention, there is automatic compensation and adjustment of any wearing action of the collectors 36. In view of the helical grooves in the tapered end portions 16a and 16b any wearing of the collectors 36 and any wearing of the tapered end portions 16a and 16b is uniform and free from variations. Also, the grooves 30 assist in maintaining the coolant fluid on the surfaces of the tapered end portions 16a and 16b. Also, the grooves 30 in helical formations permit the collectors 36 to engage the surfaces of the tapered end portions 16a and 16b in a multiplicity of spots or regions. Thus, wearing of the tapered end portions 16a and 16b and wearing of the collectors 36 is uniform.

Furthermore, due to the fact that each collector 36 is individually mounted in a holder 42 which is mounted in a retainer 40 and is spaced apart from its adjacent collectors 36 each collector 36 functions individually and thus makes maximum contact with its respective tapered end portion 16a and 16b.

The structure of this invention permits the collectors 36 to be constructed of copper. When the collectors 36 are of copper, excellent current conductivity is obtained.

Thus, it is understood that as a result of structure herein shown and described, an electrical machine of this invention has the capabilities of carrying large magnitudes of electrical current in consideration of the physical size thereof.

Also, it is to be understood that an electrical machine constructed in accordance with this invention can have high efficiency and long life, while being capable of carrying large magnitudes of electrical current in consideration of the physical size of the electrical machine.

Although the preferred embodiment of the electrical machine of this invention has been described, it will be understood that within the purview of this invention various changes may be made in the form, details, proportion and arrangement of parts, the combination thereof, and the mode of operation, which generally stated consist in an electrical machine with the scope of the appended claims.

The invention having thus been described, the following is claimed.

1. An electrical machine comprising a rotor, the rotor including a pair of tapered end portions, leaf type electrical collector means in engagement with the tapered end portions of the rotor and arranged in an annular formation coaxial with the rotor and encompassing the tapered end portions of the rotor, electrical conductor members electrically joined to the electrical collector means and extending therefrom, stator means encompassing the rotor for producing a magnetic field which encompasses the rotor, the leaf type electrical collector means including a plurality of leaf shape collector members which are in spaced-apart relationship, wick means positioned adjacent the collector members and in engagement with the end portions of the rotor, and fluid conduit means joined to the wick means for conducting fluid to the wick means.

2. An electrical machine comprising a rotor, the rotor including a pair of tapered end portions, leaf type electrical collector means in engagement with the tapered end portions of the rotor and arranged in an annular formation coaxial with the rotor and encompassing the tapered end portions of the rotor, electrical conductor members electrically joined to the electrical collector means and extending therefrom, stator means encompassing the rotor for producing a magnetic field which encompasses the rotor, the leaf type electrical collector means including a plurality of collector members in spaced-apart relationship, wick members interspersed among the electrical collector members and in engagement with the end portions of the rotor, and fluid conduit means joined to the wick members for conducting fluid to the wick members.

3. An electrical machine comprising a rotor, the rotor including a pair of tapered end portions, leaf type electrical collector means in engagement with the tapered end portions of the rotor and arranged in an annular formation coaxial with the rotor and encompassing the tapered end portions of the rotor, electrical conductor members electrically joined to the electrical collector means and extending therefrom, stator means encompassing the rotor for producing a magnetic field which encompasses the rotor, the stator means including a magnetizable housing and electrical winding means within the magnetizable housing, the electrical collector means including a plurality of individual collector members, and wick means adjacent the collector members and in engagement with the rotor, and fluid conduit means joined to the wick means for conducting fluid to the wick means.

4. An electrical machine comprising a magnetizable housing, a rotor rotatable about a given axis within the magnetizable housing, the rotor including a tapered end portion, electrical collector means in engagement with the tapered end portion of the rotor, the electrical collector means being subject to wearing action as rotation of the rotor occurs, actuator means for urging movement of the electrical collector means upon the tapered end portion and generally in a direction along the axis of rotation of the rotor as wearing of the electrical collector means occurs, and stator means encompassing the rotor for producing a magnetic field which encompasses the rotor, the stator means including an electrical conductor winding within the magnetizable housing for magnetizing the magnetizable housing.

5. The electrical machine of claim 4 in which the actuator means includes fluid pressure actuator means.

6. The electrical machine of claim 4 which includes electrical collector retainer means and in which the actuator means is operable upon the electrical collector retainer means for urging movement of the electrical collector means upon the tapered end portion of the rotor and along the axis of rotation of the rotor as wearing of the electrical collector means occurs.

7. An electrical machine comprising a magnetizable housing, a rotor rotatable within the magnetizable housing, the rotor including a pair of tapered end portions, a plurality of electrical collector members arranged in parallel closely spaced-apart annular formation and encompassing each of the tapered end portions of the rotor and engaging each of the tapered end portions of the rotor, the electrical collector members being subject to wearing action, annular collector retainer means encompassing the rotor and electrically joined to the electrical collector members, electric winding means carried by the magnetizable housing and encompassing the rotor for producing a magnetic field which encompasses the rotor, actuator means urging axial movement of the annular collector retainer means and the electrical collector members upon the tapered end portions of the rotor for compensating for wearing of the electrical collector members during operation of the electric machine.

8. An electric machine comprising a housing, a rotor rotatable within the housing, the rotor including a pair of end portions, a plurality of relatively thin electrical collector members arranged in parallel closely spaced-apart annular formation and encompassing each of the end portions of the rotor and engaging each of the end portions of the rotor, annular collector retainer means encompassing the rotor and electrically joined to the electrical collector members, and stator means carried by the housing and encompassing the rotor for producing a magnetic field which encompasses the rotor, the electrical collector members being leaf type elements which are attached to the annular collector retainer means, wick elements in engagement with the end portions of the rotor adjacent the leaf type elements, and means for conducting fluid to the wick elements.

9. An electrical machine comprising an electrically conductive rotative body having a tapered electrically conductive annular surface, a plurality of electric collector members, the electric collector members being in engagement with the tapered electrically conductive annular surface of the electrically conductive rotative body, the electric collector members being subject to wearing action, and means for relative axial movement between the electrically conductive rotative body and the electric collector members for compensation for wearing action of the electric collector members upon the tapered electrically conductive annular surface of the electrically conductive rotative body.

10. An electrical machine comprising an electrically conductive body having an electrically conductive surface, a plurality of relatively thin leaf type electric collector members, the relatively thin leaf type electric collector members being in closely spacedapart relationship wherein each of the electric collector members is spaced from its adjacent leaf type electric collector member, the electric collector members being in engagement with the electrically conductive surface of the electrically conductive body, and means for relative movement between the electrically conductive body and the electric collector members, wick members interspersed among the electric collector members and fluid conduit means for flow of fluid to the electrically conductive surface of the electrically conductive body for cooling thereof.

11. An electrical machine comprising a magnetizable housing, a rotor supported for rotation within the magnetizable housing, stator means supported by the magnetizable housing and encompassing the rotor for producing a magnetic field which encompasses the rotor, the rotor including a tapered portion, electrical collector means engaging the tapered portion of the rotor, the electrical collector means being subject to wearing action as rotation of the rotor occurs, retainer means adjacent the tapered portion of the rotor and supporting the electrical collector means, and actuator means urging movement of the electrical collector means in a generally axial direction along the tapered portion of the rotor for adjustment of the position of the electrical collector means upon the tapered portion of the rotor as wear of the electrical collector means upon the tapered portion of the rotor occurs.

* * * * *